United States Patent
Jacquin et al.

(10) Patent No.: US 6,559,083 B2
(45) Date of Patent: May 6, 2003

(54) DIELECTRIC CERAMIC COMPOSITION

(75) Inventors: Jeffrey R. Jacquin, Albuquerque, NM (US); Randy E. Rose, Rio Rancho, NM (US)

(73) Assignee: CTS Corporation, Elkhart, IN (US)

( * ) Notice: Subject to any disclaimer, the term of this patent is extended or adjusted under 35 U.S.C. 154(b) by 183 days.

(21) Appl. No.: 09/836,309

(22) Filed: Apr. 17, 2001

(65) Prior Publication Data

US 2002/0151429 A1 Oct. 17, 2002

(51) Int. Cl.[7] .............................................. C04B 35/119
(52) U.S. Cl. ........................ 501/135; 501/127; 501/136; 501/137; 501/138; 501/139
(58) Field of Search ................................ 501/127, 135, 501/136, 137, 138, 139

(56) References Cited

U.S. PATENT DOCUMENTS

| | | | |
|---|---|---|---|
| 4,866,016 A | 9/1989 | Ando et al. | |
| 5,024,980 A | 6/1991 | Negas et al. | |
| 5,147,835 A | 9/1992 | Fronzak et al. | |
| 5,792,379 A | 8/1998 | Dai et al. | |
| 5,830,819 A | 11/1998 | Shikata et al. | |
| 6,242,376 B1 * | 6/2001 | Jacquin et al. | 501/134 |
| 6,284,694 B1 * | 9/2001 | Moeltgen et al. | 501/127 |

FOREIGN PATENT DOCUMENTS

| JP | 09052762 A | 12/1997 |
|---|---|---|
| JP | 10120460 | 12/1998 |

OTHER PUBLICATIONS

U.S. patent application Ser. No. 09/399,978, CTS Corporation, filed Sep. 21, 1999.
Gui Zhilun et al., "Low Temperature Sintering of Lead—Based Piezoelectric Ceramics" *American Ceramic Society-*(Jul. 11, 1998) vol. 72, No. 3, pp. 486–491.
Huang et al, "Improved High Q value of $CaTiO_3$ solid solution with near zero temperature coefficient of resonant frequency" *Pergamon—Materials Research Bulletin*, (Apr. 9, 2001) No. 36, pp. 1645–1652.
Huang et al, "Dielectric Properties of $CaTiO_3$–Ca $(Mg_{1/3} Nb_{2/3})O_3$ Ceramic System at Microwave Frequency" *Jpn. J. Appl. Phys*(Aug. 11, 2000) vol. 39, pp. 6608–6611.

* cited by examiner

*Primary Examiner*—David Brunsman
(74) *Attorney, Agent, or Firm*—Alfred E. Hall; Nelson Nolte

(57) ABSTRACT

The present invention provides a dielectric ceramic composition comprising a base material represented by the general formula: (x) $Al_2O_3$+(y) $TiO_2$, where x and y are percentages of the total weight of the base material, with x being in the range of about 60 to about 96 and y being in the range of about 4 to about 40. Also provided is a first additive material comprising $Nb_2O_5$ and a second additive material comprising $BaZrO_3$. In another embodiment the present invention provides a sintered dielectric ceramic composition comprising a base material represented by the general formula: (x) $Al_2O_3$+(y) $TiO_2$, where x and y are percentages of the total weight of the base material, with x being in the range of about 60 to about 96 and y being in the range of about 4 to about 40. Also provided is a first additive material comprising $Nb_2O_5$ and a second additive material comprising $BaZrO_3$.

20 Claims, No Drawings

DIELECTRIC CERAMIC COMPOSITION

FIELD OF THE INVENTION

This invention relates to alumina based dielectric ceramic compositions. Specifically, the invention is an alumina based dielectric ceramic composition exhibiting a low dielectric constant, a high Q factor, a low temperature coefficient of frequency, and a high percent fired density. The composition requires a relatively lower peak soak temperature during sintering (as compared to conventional alumina ceramics) and is particularly suited for use in high frequency filter applications.

BACKGROUND OF THE INVENTION

Dielectric ceramic compositions have found use in the field of electronic communications in such components as filters and resonators. In recent years, the range of frequencies used in electronic communications has expanded so that higher frequencies, i.e., those in the microwave range, are increasingly utilized. A filter may be employed to select a signal within a specific frequency range. The frequency range selected by the filter is referred to as the resonant frequency. Such filters may be based upon a block of dielectric material, often a ceramic material. The resonant frequency of the filter is determined by the dielectric properties of that material and by the dimensions of the block. In general, a dielectric material is required which has a low dielectric loss (indicated by a low dielectric loss factor) in order to minimize energy absorption by the dielectric material that would otherwise reduce resonant signal intensity. The Q is defined as the inverse of the dielectric loss factor. Therefore, a relatively lower loss factor results in a relatively higher Q. In general, a higher dielectric constant allows the design of a filter with reduced dimensions. For resonant frequencies above about 2 GHz however, it becomes more difficult to obtain a functional filter because of the small dimensions necessitated by the shorter wavelengths. Thus, a material with a lower dielectric constant, and lower dielectric loss factor (high Q ), is needed in order to maintain the dimensions of the filter in a range conducive to manufacturing limitations. A percentage-fired density approaching 100% also is conducive to achieving a high Q.

Conventional dielectric ceramic materials made of alumina or modified alumina do not exhibit sufficiently high Q values along with sufficiently low temperature coefficient of frequency for satisfactory use as filters and resonators in the microwave frequency band. Additionally, these conventional materials are limited in that they require sintering at relatively high peak soak temperatures of about 1550° C. The peak soak temperature is the maximum (peak) temperature achieved during sintering; it is at this temperature that the material remains (soaks) for a period of time.

Furthermore, under normal operating conditions, a filter is typically subjected to a range of temperatures. As temperature changes, the filter's dimensions are altered by thermal expansion or-contraction of the filter material. This results in a shift in resonant frequency. Dielectric properties are affected by a change in temperature, also tending to shift the resonant frequency. The change in resonant frequency caused by a change in temperature is termed the temperature dependence of the resonant frequency. The temperature coefficient of frequency ($T_f$) expresses the frequency shift caused by a change in temperature of 1° C. For example, a $T_f$ of +5 means that the resonant frequency shifts upward by five ppm with a temperature increase of 1° C. A $T_f$ of −5 means that the resonant frequency shifts downward by five ppm with a temperature decrease of 1° C. A temperature coefficient approaching zero (0) is preferred to minimize the shift in resonant frequency due to variations in operating temperature.

SUMMARY OF THE INVENTION

The present invention provides a dielectric ceramic composition comprising a base material represented by the general formula: (x) $Al_2O_3$+(y) $TiO_2$, where x and y are percentages of the total weight of the base material, with x being in the range of about 60 to about 96 and y being in the range of about 4 to about 40. Also provided is a first additive material comprising $Nb_2O_5$ and a second additive material comprising $BaZrO_3$.

In another embodiment the present invention provides a sintered dielectric ceramic composition comprising a base material represented by the general formula: (x) $Al_2O_3$+(y) $TiO_2$, where x and y are percentages of the total weight of the base material, with x being in the range of about 60 to about 96 and y being in the range of about 4 to about 40. Also provided is a first additive material comprising $Nb_2O_5$ and a second additive material comprising $BaZrO_3$.

DETAILED DESCRIPTION OF THE PREFERRED EMBODIMENT

The dielectric ceramic composition of the present invention comprises a base material and at least one additive material. The base material is represented by the general formula:

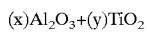

$$(x)Al_2O_3+(y)TiO_2$$

where x and y are percentages of the total weight of said base material. The value of x is in the range of about 60 to about 96, with y being in the range of about 4 to about 40. The values of x and y are more preferably in the range of about 94 to about 96 and about 4 to about 6, respectively. Alumina is commonly used in dielectric ceramic compositions utilized in electrical applications, and on its own exhibits a high Q. However, on its own alumina may exhibit an unacceptably high (high absolute value) $T_f$ of approximately −55 ppm/° C. Moreover, alumina on its own requires a peak soak temperature during sintering of about 1550° C. Titania, on its own, also exhibits a relatively high Q, but has the disadvantage of having an extremely high $T_f$ (absolute value) of approximately +450 ppm/° C.

The additive material in a first embodiment of this invention is $Nb_2O_5$ and $BaZrO_3$, wherein $Nb_2O_5$ is in the range of about 0.01 to about 1.0 weight percent of the base material, more preferably from about 0.01 to about 0.75 weight percent of the base material and $BaZrO_3$ is in the range of about 0.01 to about 2.0 weight percent of the base material, more preferably within about 0.075 to about 1.5 weight percent of the base material. When the $Nb_2O_5$ and $BaZrO_3$ are included in the above amounts, the composition can be sintered at a peak soak temperature in the range of about 1320 to about 1400° C., more optimally of about 1350 to about 1370° C., for about 4 hours. Moreover, the resulting sintered dielectric ceramic composition had an increased Q.

A second embodiment of the invention includes an additive material comprising $Nb_2O_5$ and at least one component selected from the group consisting of $BaCO_3$, $SnO_2$, $Mn_2O_3$, $MnCO_3$, $Mg(OH)_2$, $Y_2O_3$, $MgO$, $ZnO$, $SrTiO_3$, $ZrO_2$, $Nd_2O_3$, and $Sm_2O_3$. The $BaCO_3$ and $ZrO_2$ additives lower the firing temperature, help densify the fired material to the range of 99–100%, and adjust $T_f$ in a positive manner ($T_f$ may be negative or positive). The $SnO_2$ additive lowers the firing temperature and adjusts $T_f$ in a positive manner. The $Mn_2O_3$, $MnCO_3$, $Mg(OH)_2$, $Y_2O_3$, and MgO additives lower the firing temperature and help densify the fired material to the range of 99–100%. The ZnO helps lower the firing temperature. The $SrTiO_3$, $Sm_2O_3$, and $Nd_2O_3$ help adjust $T_f$ in a positive manner.

Improved results are achieved with the following additive compositions: $BaCO_3$ (when present) in the range of about 0.25 to about 1 percent, more preferably about 0.25 to about 0.5; $SnO_2$ (when present) in the range of about 0.5 to about 1.25 percent; $Mn_2O_3$ (when present) in the range of about 0.01 to about 0.25 percent, more preferably from about 0.01 to about 0.119; $MnCO_3$ (when present) in the range of about 0.02 to about 0.1 percent; $Mg(OH)_2$ (when present) in the range of about 0.005 to about 0.075 percent; $Y_2O_3$ (when present) in the range of about 0.004 to about 0.03 percent, more preferably about 0.004 to about 0.01 percent; MgO (when present) in the range of about 0.01 to about 0.20 percent; ZnO (when present) in the range of about 0.01 to about 0.75 percent; $SrTiO_3$ (when present) in the range of about 0.30 to about 0.90 percent; $ZrO_2$ (when present) in the range of about 0.01 to about 0.03 percent; $Nd_2O_3$ (when present) in the range of about 0.10 to about 0.20 percent; and $Sm_2O_3$ (when present) in the range of about 0.10 to about 0.20 percent. All percentages of the additive components are expressed in terms of the total weight of the base material.

Addition of one or more of the above mentioned components allows for a peak soak temperature during sintering of about 1320 to about 1400° C., more optimally of about 1350 to about 1370° C. The resulting sintered dielectric ceramic compositions exhibit the following improved electrical properties: dielectric constant in the range of about 10 to about 12, more preferably from about 11.5 to about 12; a percent fired density of about 95 to about 100, more preferably from about 98.33 to about 99.20; a Q*frequency (Q*freq) of about 10,000 to about 55,000, more preferably from about 30,000 to about 50,000; and a temperature coefficient of frequency $(T_f)$ from about −30 to about 30 ppm/° C., more preferably from about −3 to about 1, within a high frequency range greater than about 2 GHz.

An important feature of this invention is the lowered peak soak temperature necessary for sintering the dielectric ceramic composition. A lowered peak soak temperature provides energy savings, decreases ramp up time, and provides added flexibility in the manufacturing process. Other important features of this invention are the achievement of a dielectric constant between 10–12, a high Q, a $T_f$ approaching zero (0), and a high percent fired density. These features results in a dielectric ceramic composition particularly suited for use as an electrical component in the high frequency range.

A dielectric ceramic composition in accordance with the invention can be manufactured as follows:

Raw materials are weighed out according to the weight percentages described above, based on a 530-gram total batch size. Weighing is performed on a Mettler-Toledo PM 300000K scale (Worthington, Ohio). Ball mill mixing is used to disperse and mix the raw materials. Deionized water is added at 42 weight percent (223 g) of the total batch weight, and Tamol 963 (Rohm and Haas Corporation, Montgomeryville, Pa.) dispersant is added at 1 weight percent (5.30 g) of the total batch weight. The ball mills are 0.3 gallon size, rubber lined and from U.S. Stoneware, East Palestine, Ohio. Both alumina media (U.S. Stoneware) and zirconia media (Zircoa, Solon, Ohio) are used with diameter sizes ranging from between 0.25 to 0.50 inches. The mill media charge is between 50–55 volume percent. The ball mill is run for between 4 and 6 hours.

The slurry is dried overnight in teflon pans at 110° C. to a hard cake. The cakes are broken up and mixed with 1 weight % polyvinyl alcohol (Air Products, Allentown, Pa.), and 1.2 weight % polyethylene glycol 200 (Union Carbide, Danbury, Conn.) using a mortar and pestle. No calcining is necessary. The material is passed through a 60 mesh (U.S. Sieve Series) screen to prepare for pressing. Cylindrical pucks are pressed to 20,000 pounds on a 1.1 inch diameter die. Heights will range between 0.50 and 1.0 inches. Target green densities are between 2.20 and 2.30 $g/cm^3$, and target fired densities are between 3.90 and 4.00 $g/cm^3$. The pucks are fired in a Thermolyne, High Temperature Lab Kiln, Model #46200 from Dubuque, Iowa. The pucks follow a basic firing profile including a binder burnout stage, and reasonable ramp rates between 2° and 10° C. per minute. Peak soak temperatures range between 1350° and 1400° C. for a 4 hour soak time. Actual temperature is tracked using Philips Components High Temperature Control Rings (range 1130–1400° C.).

Electrical properties of the cylinders are measured on a Hewlett-Packard 3853C 6 GHz analyzer (HP Palo-Alto, Calif.) using the Haake Coleman parallel plate technique. Measured parameters are: dielectric constant (K), Q, and temperature coefficient of frequency $(T_f)$, as well as density.

Although various embodiments of this invention have been shown and described, it should be understood that various modifications and substitutions, as well as rearrangements and combinations of the preceding embodiments, can be made by those skilled in the art, without departing from the novel spirit and scope of this invention.

We claim:

1. A dielectric ceramic composition comprising:

a base material represented by the general formula $$(x)Al_2O_3+(y)TiO_2$$

where x and y are percentages of the total weight of the base material, with x being in the range of about 60 to about 96 and y being in the range of about 4 to about 40;

a first additive material comprising $Nb_2O_5$; and a second additive material comprising $BaZrO_3$.

2. The dielectric ceramic composition of claim 1 wherein the first additive material is present in an amount having a weight within the range of about 0.01 to about 1.0 percent of the total weight of the base material.

3. The dielectric ceramic composition of claim 2 wherein the first additive material is present in an amount having a weight within the range of about 0.01 to about 0.75 percent of the total weight of the base material.

4. The dielectric ceramic composition of claim 1 wherein the second additive material is present in an amount having a weight within the range of about 0.01 to about 2.0 percent of the total weight of the base material.

5. The dielectric ceramic composition of claim 4 wherein the second additive material is present in an amount having a weight within the range of about 0.075 to about 1.5 percent of the total weight of the base material.

6. The dielectric ceramic composition of claim 1 wherein x is in the range of about 93.5 to about 96 and y is in the range of about 4 to about 6.5.

7. The dielectric ceramic composition of claim 1 further comprising a third additive selected from the group consisting of: $BaCO_3$, $SnO_2$, $Mn_2O_3$, $MnCO_3$, $Mg(OH)_2$, $Y_2O_3$, MgO, ZnO, $SrTiO_3$, $ZrO_2$, $Nd_2O_3$, and $Sm_2O_3$.

8. The dielectric ceramic composition of claim 7, wherein:

the $BaCO_3$, when present, is in the range of about 0.25 to about 1 percent;

the $SnO_2$, when present, is in the range of about 0.5 to about 1.25 percent;

the $Mn_2O_3$, when present, in the range of about 0.01 to about 0.25 percent;

the $MnCO_3$, when present, is in the range of about 0.02 to about 0.1 percent;

the $Mg(OH)_2$, when present, is in the range of about 0.005 to about 0.075 percent;

the $Y_2O_3$, when present, is in the range of about 0.004 to about 0.03 percent;

the $MgO$, when present, is in the range of about 0.01 to about 0.20 percent;

the $ZnO$, when present, in the range of about 0.01 to about 0.75 percent;

the $SrTiO_3$, when present, in the range of about 0.30 to about 0.90 percent;

the $ZrO_2$, when present, is in the range of about 0.01 to about 0.03 percent;

the $Nd_2O_3$, when present, is in the range of about 0.10 to about 0.20 percent; and the $Sm_2O_3$, when present, is in the range of about 0.10 to about 0.20 percent wherein all percentages are in terms of the total weight of the base material.

9. The dielectric ceramic composition of claim 8, wherein:

the $BaCO_3$, when present, is in the range of about 0.25 to about 0.5 percent;

the $Mn_2O_3$, when present, is in the range of about 0.01 to about 0.119 percent;

the $Y_2O_3$, when present, is in the range of about 0.004 to about 0.01 percent wherein all percentages are in terms of the total weight of the base material.

10. A sintered dielectric ceramic composition comprising: a base material represented by the general formula

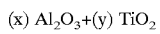

$$(x)\ Al_2O_3 + (y)\ TiO_2$$

where x and y are percentages of the total weight of the base material, with x being in the range of about 60 to about 96 and y being in the range of about 4 to about 40;

a first additive material comprising $Nb_2O_5$; and a second additive material comprising $BaZrO_3$.

11. The sintered dielectric ceramic composition of claim 10 wherein a dielectric constant of the sintered dielectric ceramic composition is in the range of about 10 to about 12.

12. The sintered dielectric ceramic composition of claim 11 wherein the dielectric constant is in the range of about 11.5 to about 12.

13. The sintered dielectric ceramic composition of claim 10 wherein a Q*freq value of the sintered dielectric ceramic composition is in the range of about 10,000 to about 55,000.

14. The sintered dielectric ceramic composition of claim 13 wherein the Q*freq value is in the range of about 30,000 to about 50,000.

15. The sintered dielectric ceramic composition of claim 10 wherein a temperature coefficient of frequency of the sintered dielectric ceramic composition is in the range of about −30 to about 30 ppm/° C.

16. The sintered dielectric ceramic composition of claim 15 wherein the temperature coefficient of frequency is in the range of about −3 to about 1 ppm/° C.

17. The sintered dielectric ceramic composition of claim 10 wherein a percent fired density of the sintered dielectric ceramic composition is in the range of about 95 to about 100.

18. The sintered dielectric ceramic composition of claim 17 wherein the percent fired density is in the range of about 98.33 to about 99.20.

19. The sintered dielectric ceramic composition of claim 10 resulting from sintering with a peak soak temperature in the range of about 1320 to about 1400° C.

20. The sintered dielectric ceramic composition of claim 19 resulting from sintering with a peak soak temperature in the range of about 1350 to about 1370° C.

* * * * *